US010055869B2

(12) United States Patent
Borrelli et al.

(10) Patent No.: US 10,055,869 B2
(45) Date of Patent: Aug. 21, 2018

(54) ENHANCED REALITY SYSTEM FOR VISUALIZING, EVALUATING, DIAGNOSING, OPTIMIZING AND SERVICING SMART GRIDS AND INCORPORATED COMPONENTS

(71) Applicant: DELTA ENERGY & COMMUNICATIONS, INC., Murrieta, CA (US)

(72) Inventors: Angelo Borrelli, Fairhope, AL (US); Keith Teichmann, Newton Centre, MA (US)

(73) Assignee: DELTA ENERGY & COMMUNICATIONS, INC., Murrieta, CA (US)

( * ) Notice: Subject to any disclaimer, the term of this patent is extended or adjusted under 35 U.S.C. 154(b) by 42 days.

(21) Appl. No.: 15/234,293

(22) Filed: Aug. 11, 2016

(65) Prior Publication Data

US 2017/0098320 A1    Apr. 6, 2017

Related U.S. Application Data

(60) Provisional application No. 62/203,719, filed on Aug. 11, 2015.

(51) Int. Cl.
*G06T 11/60* (2006.01)
*G06F 3/01* (2006.01)
(Continued)

(52) U.S. Cl.
CPC .............. *G06T 11/60* (2013.01); *G06F 3/012* (2013.01); *G06F 3/167* (2013.01); *H04N 7/181* (2013.01);
(Continued)

(58) Field of Classification Search
CPC .......... G06T 11/60; G06F 3/167; G06F 3/012; G06F 3/04886; H04N 7/181; H04Q 2209/60; H04Q 2209/40; H04Q 9/00
See application file for complete search history.

(56) References Cited

U.S. PATENT DOCUMENTS 2,704,809 A  3/1955  Williams
4,724,381 A  2/1988  Crimmins
(Continued)

FOREIGN PATENT DOCUMENTS

CN  101860978  10/2010
CN  102255869  11/2011
(Continued)

OTHER PUBLICATIONS

International Search Report issued on Dec. 9, 2016 in counterpart international patent application No. PCT/US2016/046509 (13 pages).

(Continued)

*Primary Examiner* — Maurice L. McDowell, Jr.
(74) *Attorney, Agent, or Firm* — Ware, Fressola, Maguire & Barber LLP

(57) ABSTRACT

A head-mounted user device is provided for use in a smart grid network. The head-mounted user device includes a signal processor configured to receive signaling containing information about one or more assets in a distributed power grid network from a data collection device configured to receive data from the assets in the distributed power grid network; and determine, based at least partly on the signaling received from the data collection device, signaling containing asset display information about the one or more assets. The head-mounted user device also includes an augmented or mixed reality display configured to display an actual field of view of the user and the asset display
(Continued)

information by overlaying the asset display information over the actual field of view.

18 Claims, 9 Drawing Sheets

(51) Int. Cl.
    *H04N 7/18* (2006.01)
    *G06F 3/16* (2006.01)
    *H04Q 9/00* (2006.01)
    *G06F 3/0488* (2013.01)

(52) U.S. Cl.
    CPC .......... *G06F 3/04886* (2013.01); *H04Q 9/00* (2013.01); *H04Q 2209/40* (2013.01); *H04Q 2209/60* (2013.01)

(56) References Cited

U.S. PATENT DOCUMENTS

| | | |
|---|---|---|
| 5,426,360 A | 6/1995 | Maraio et al. |
| 5,748,104 A | 5/1998 | Argyroudis et al. |
| 5,940,009 A | 8/1999 | Loy et al. |
| 6,018,449 A | 1/2000 | Nelson et al. |
| 6,211,764 B1 | 4/2001 | Schweitzer, Jr. |
| 6,300,881 B1 | 10/2001 | Yee et al. |
| 6,549,120 B1 | 4/2003 | de Buda |
| 6,711,512 B2 | 3/2004 | Noh |
| 6,829,491 B1 | 12/2004 | Yea et al. |
| 6,856,256 B2 | 2/2005 | Winkler |
| 6,880,086 B2 | 4/2005 | Kidder et al. |
| 6,906,630 B2 | 6/2005 | Georges et al. |
| 6,998,962 B2 | 2/2006 | Cope et al. |
| 7,049,976 B2 | 5/2006 | Hunt et al. |
| 7,054,770 B2 | 5/2006 | Swarztrauber et al. |
| 7,058,524 B2 | 6/2006 | Hayes et al. |
| 7,107,329 B1 | 9/2006 | Schroder et al. |
| 7,126,558 B1 | 10/2006 | Dempski |
| 7,271,735 B2 | 9/2007 | Rogai |
| 7,304,587 B2 | 12/2007 | Boaz |
| 7,310,052 B2 | 12/2007 | Bowman |
| 7,402,993 B2 | 7/2008 | Morrison |
| 7,440,436 B2 | 10/2008 | Cheng et al. |
| 7,496,078 B2 | 2/2009 | Rahman |
| 7,733,839 B1 | 6/2010 | Frank et al. |
| 7,747,534 B2 | 6/2010 | Villicana et al. |
| 7,764,943 B2 | 7/2010 | Radtke |
| 7,894,371 B2 | 2/2011 | Bonta et al. |
| 7,936,163 B2 | 5/2011 | Lee, Jr. |
| 7,940,039 B2 | 5/2011 | de Buda |
| 7,961,740 B2 | 6/2011 | Flammer, III et al. |
| 8,054,199 B2 | 11/2011 | Addy |
| 8,060,259 B2 | 11/2011 | Budhraja et al. |
| 8,121,741 B2 | 2/2012 | Taft et al. |
| 8,145,732 B2 | 3/2012 | Kumar et al. |
| 8,194,275 B2 | 6/2012 | Furst et al. |
| 8,279,870 B2 | 10/2012 | Flammer, III et al. |
| 8,305,932 B2 | 11/2012 | Qiu et al. |
| 8,311,863 B1 | 11/2012 | Kemp |
| 8,370,697 B2 | 2/2013 | Veillette |
| 8,385,978 B2 | 2/2013 | Leung et al. |
| 8,401,709 B2 | 3/2013 | Cherian et al. |
| 8,412,735 B2 | 4/2013 | Yeh et al. |
| 8,428,021 B2 | 4/2013 | Karunakaran et al. |
| 8,437,883 B2 | 5/2013 | Powell et al. |
| 8,441,372 B2 | 5/2013 | Smith et al. |
| 8,452,555 B2 | 5/2013 | Swarztrauber et al. |
| 8,509,953 B2 | 8/2013 | Taft |
| 8,543,250 B2 | 9/2013 | Seo et al. |
| 8,553,561 B1 | 10/2013 | Chokshi et al. |
| 8,566,046 B2 | 10/2013 | Deaver, Sr. |
| 8,583,520 B1 | 11/2013 | Forbes, Jr. |
| 8,600,572 B2 | 12/2013 | Sri-Jayantha |
| 8,660,868 B2 | 2/2014 | Vogel et al. |
| 8,755,303 B2 | 6/2014 | Hughes et al. |
| 8,792,626 B2 | 7/2014 | Cook et al. |
| 8,847,826 B2 | 9/2014 | Rao et al. |
| 8,855,102 B2 | 10/2014 | Borleske et al. |
| 8,862,281 B2 | 10/2014 | Yoneda et al. |
| 8,874,477 B2 | 10/2014 | Hoffberg |
| 8,880,234 B2 | 11/2014 | Sekoguchi et al. |
| 8,909,358 B2 | 12/2014 | Kamouskos |
| 8,917,716 B2 | 12/2014 | Tran |
| 8,937,497 B1 | 1/2015 | Tobin |
| 8,959,114 B2 | 2/2015 | Rehman |
| 8,963,807 B1 | 2/2015 | Lee et al. |
| 8,964,757 B2 | 2/2015 | Watson et al. |
| 8,965,590 B2 | 2/2015 | Boardman et al. |
| 8,970,394 B2 | 3/2015 | Veillette |
| 9,002,670 B2 | 4/2015 | Hurri et al. |
| 9,013,173 B2 | 4/2015 | Veillette |
| 9,014,996 B2 | 4/2015 | Kamel et al. |
| 9,043,174 B2 | 5/2015 | Arya et al. |
| 9,052,216 B2 | 6/2015 | Kamel et al. |
| 9,087,451 B1 | 7/2015 | Jarrell |
| 9,110,101 B2 | 8/2015 | Pietrowicz et al. |
| 9,112,381 B2 | 8/2015 | Carralero et al. |
| 9,118,219 B2 | 8/2015 | Booth |
| 9,129,355 B1 | 9/2015 | Harvey et al. |
| 9,141,653 B2 | 9/2015 | Zhou et al. |
| 9,144,082 B2 | 9/2015 | Rubin et al. |
| 9,162,753 B1 | 10/2015 | Panto et al. |
| 9,400,192 B1 | 7/2016 | Salser, Jr. et al. |
| 9,400,867 B2 | 7/2016 | Boyd et al. |
| 9,402,292 B1 | 7/2016 | Gordin et al. |
| 9,451,060 B1 | 9/2016 | Bowers et al. |
| 9,654,173 B2 | 5/2017 | Barzegar et al. |
| 2001/0038342 A1 | 11/2001 | Foote |
| 2002/0046368 A1 | 4/2002 | Friedrich et al. |
| 2002/0064010 A1 | 5/2002 | Nelson et al. |
| 2003/0050737 A1 | 3/2003 | Osann, Jr. |
| 2003/0078996 A1 | 4/2003 | Baldwin |
| 2003/0128149 A1 | 7/2003 | Miceli et al. |
| 2004/0082203 A1 | 4/2004 | Logvinov et al. |
| 2005/0078624 A1 | 4/2005 | Shu et al. |
| 2006/0007016 A1 | 1/2006 | Borkowski et al. |
| 2006/0056363 A1 | 3/2006 | Ratiu et al. |
| 2006/0141940 A1 | 6/2006 | Bloom et al. |
| 2007/0043849 A1 | 2/2007 | Lill et al. |
| 2007/0048702 A1 | 3/2007 | Jang et al. |
| 2007/0088630 A1 | 4/2007 | MacLeod et al. |
| 2008/0100436 A1 | 5/2008 | Banting et al. |
| 2008/0109387 A1 | 5/2008 | Deaver et al. |
| 2008/0317047 A1 | 12/2008 | Zeng et al. |
| 2009/0003662 A1 | 1/2009 | Joseph et al. |
| 2009/0088907 A1 | 4/2009 | Lewis et al. |
| 2009/0111456 A1 | 4/2009 | Shaffer et al. |
| 2009/0146839 A1 | 6/2009 | Reddy et al. |
| 2009/0167558 A1 | 7/2009 | Borleske et al. |
| 2009/0187284 A1 | 7/2009 | Kreiss et al. |
| 2009/0267792 A1 | 10/2009 | Crichlow |
| 2010/0074176 A1 | 3/2010 | Flammer, II et al. |
| 2010/0313146 A1 | 12/2010 | Nielsen et al. |
| 2011/0047230 A1 | 2/2011 | McGee |
| 2011/0066297 A1 | 3/2011 | Saberi et al. |
| 2011/0090833 A1 | 4/2011 | Kneckt et al. |
| 2011/0208367 A1 | 8/2011 | Sackman et al. |
| 2012/0007885 A1 | 1/2012 | Huston |
| 2012/0029897 A1 | 2/2012 | Cherian et al. |
| 2012/0050971 A1 | 3/2012 | Seal et al. |
| 2012/0059609 A1 | 3/2012 | Oh et al. |
| 2012/0078686 A1 | 3/2012 | Bashani |
| 2012/0089268 A1 | 4/2012 | Torre et al. |
| 2012/0092114 A1 | 4/2012 | Matthews |
| 2012/0126994 A1 | 5/2012 | Sobotka et al. |
| 2012/0131324 A1 | 5/2012 | Ansari et al. |
| 2012/0229089 A1 | 9/2012 | Bemmel et al. |
| 2012/0230237 A1 | 9/2012 | Gong et al. |
| 2012/0242698 A1 | 9/2012 | Haddick et al. |
| 2012/0249741 A1 | 10/2012 | Maciocci et al. |
| 2012/0253881 A1 | 10/2012 | Schneider et al. |
| 2012/0265355 A1 | 10/2012 | Bernheim et al. |
| 2012/0277926 A1 | 11/2012 | Nielsen et al. |

(56) References Cited

U.S. PATENT DOCUMENTS

| | | |
|---|---|---|
| 2012/0303746 A1 | 11/2012 | Yu et al. |
| 2012/0316688 A1 | 12/2012 | Boardman et al. |
| 2012/0316696 A1 | 12/2012 | Boardman et al. |
| 2013/0026986 A1 | 1/2013 | Parthasarathy et al. |
| 2013/0035802 A1 | 2/2013 | Khaitan et al. |
| 2013/0069985 A1 | 3/2013 | Wong et al. |
| 2013/0077610 A1 | 3/2013 | Amini et al. |
| 2013/0123998 A1 | 5/2013 | King et al. |
| 2013/0190939 A1 | 7/2013 | Lenox |
| 2013/0203378 A1 | 8/2013 | Vos et al. |
| 2013/0218495 A1 | 8/2013 | Boone et al. |
| 2013/0222215 A1 | 8/2013 | Kobayashi |
| 2013/0278437 A1 | 10/2013 | Wyk |
| 2013/0278631 A1 | 10/2013 | Border et al. |
| 2013/0289782 A1 | 10/2013 | Giroti |
| 2013/0297087 A1 | 11/2013 | Koster et al. |
| 2013/0297239 A1 | 11/2013 | Arya et al. |
| 2013/0297868 A1 | 11/2013 | Yin et al. |
| 2013/0304264 A1 | 11/2013 | Shao |
| 2014/0067330 A1 | 3/2014 | Flammer, III |
| 2014/0092765 A1 | 4/2014 | Agarwal et al. |
| 2014/0098685 A1 | 4/2014 | Shattil |
| 2014/0129160 A1 | 5/2014 | Tran |
| 2014/0167977 A1 | 6/2014 | Bean et al. |
| 2014/0172133 A1 | 6/2014 | Snyder |
| 2014/0183964 A1 | 7/2014 | Walley |
| 2014/0233620 A1 | 8/2014 | Bernheim et al. |
| 2014/0237525 A1 | 8/2014 | Rothschild et al. |
| 2014/0241354 A1 | 8/2014 | Shuman et al. |
| 2014/0244017 A1 | 8/2014 | Freiwirth et al. |
| 2014/0244768 A1 | 8/2014 | Shuman et al. |
| 2014/0244833 A1 | 8/2014 | Sharma et al. |
| 2014/0267400 A1 | 9/2014 | Mabbutt et al. |
| 2014/0270749 A1 | 9/2014 | Miniscalo et al. |
| 2014/0277813 A1 | 9/2014 | Powell et al. |
| 2014/0279694 A1 | 9/2014 | Gauger et al. |
| 2014/0289004 A1 | 9/2014 | Monforte et al. |
| 2014/0297206 A1 | 10/2014 | Silverman |
| 2014/0300210 A1 | 10/2014 | Abi-Ackel et al. |
| 2014/0300344 A1 | 10/2014 | Turner et al. |
| 2014/0306525 A1 | 10/2014 | Greer et al. |
| 2014/0312802 A1 | 10/2014 | Recker et al. |
| 2014/0320306 A1 | 10/2014 | Winter |
| 2014/0334073 A1 | 11/2014 | Thompson et al. |
| 2014/0361907 A1 | 12/2014 | Bernheim et al. |
| 2014/0368189 A1 | 12/2014 | Bernheim et al. |
| 2014/0371941 A1 | 12/2014 | Keller et al. |
| 2014/0372583 A1 | 12/2014 | Tseng |
| 2014/0376405 A1 | 12/2014 | Erickson et al. |
| 2014/0376914 A1 | 12/2014 | Miniscalo |
| 2014/0380488 A1 | 12/2014 | Datta Ray et al. |
| 2015/0002186 A1 | 1/2015 | Taft |
| 2015/0019342 A1 | 1/2015 | Gupta |
| 2015/0019553 A1 | 1/2015 | Shaashua et al. |
| 2015/0058445 A1 | 2/2015 | Choi et al. |
| 2015/0063202 A1 | 3/2015 | Mazzarella et al. |
| 2015/0066772 A1 | 3/2015 | Griffin et al. |
| 2015/0094874 A1 | 4/2015 | Hall et al. |
| 2015/0094968 A1 | 4/2015 | Jia et al. |
| 2015/0112469 A1 | 4/2015 | Da Silva Neto et al. |
| 2015/0121470 A1 | 4/2015 | Rongo et al. |
| 2015/0127601 A1 | 5/2015 | McGill et al. |
| 2015/0142963 A1 | 5/2015 | Choi et al. |
| 2015/0148979 A1 | 5/2015 | Forbes, Jr. |
| 2015/0149396 A1 | 5/2015 | Arya et al. |
| 2015/0155713 A1 | 6/2015 | Forbes, Jr. |
| 2015/0163849 A1 | 6/2015 | Bauer et al. |
| 2015/0179062 A1 | 6/2015 | Ralston et al. |
| 2015/0200846 A1 | 7/2015 | Hui et al. |
| 2015/0220762 A1 | 8/2015 | Jiang et al. |
| 2015/0249595 A1 | 9/2015 | Geiger |
| 2015/0256433 A1 | 9/2015 | Sum et al. |
| 2015/0256435 A1 | 9/2015 | Sum et al. |
| 2015/0276433 A1 | 10/2015 | Brahmajosyula et al. |
| 2015/0281996 A1 | 10/2015 | Rubin et al. |
| 2015/0288532 A1 | 10/2015 | Veyseh et al. |
| 2015/0294557 A1 | 10/2015 | Willig et al. |
| 2015/0311951 A1 | 10/2015 | Hariz |
| 2015/0370615 A1 | 12/2015 | Pi-Sunyer |
| 2015/0373521 A1 | 12/2015 | Olesen et al. |
| 2015/0373641 A1 | 12/2015 | Yamana et al. |
| 2016/0029384 A1 | 1/2016 | Sidhu et al. |
| 2016/0134932 A1 | 5/2016 | Karp et al. |
| 2016/0214715 A1 | 7/2016 | Meffert |
| 2016/0292205 A1 | 10/2016 | Massey et al. |
| 2016/0327603 A1 | 11/2016 | Sonderegger et al. |
| 2016/0360361 A1 | 12/2016 | Ross et al. |
| 2017/0003142 A1 | 1/2017 | Allcorn et al. |
| 2017/0108236 A1 | 4/2017 | Guan et al. |
| 2017/0339536 A1 | 11/2017 | Lewis et al. |

FOREIGN PATENT DOCUMENTS

| | | |
|---|---|---|
| CN | 102355682 | 2/2012 |
| CN | 102412530 | 4/2012 |
| CN | 102508989 | 6/2012 |
| CN | 202513670 | 10/2012 |
| CN | 103078673 | 5/2013 |
| CN | 103209385 | 7/2013 |
| CN | 103313437 | 9/2013 |
| CN | 103488988 | 1/2014 |
| CN | 103810753 | 5/2014 |
| CN | 203965904 | 11/2014 |
| CN | 104238730 | 12/2014 |
| CN | 104333733 | 2/2015 |
| CN | 204142366 | 2/2015 |
| CN | 204203734 | 3/2015 |
| CN | 104485746 | 4/2015 |
| CN | 104581087 | 4/2015 |
| CN | 204465736 | 7/2015 |
| CN | 204595654 | 8/2015 |
| EP | 2296069 | 3/2011 |
| EP | 2818878 | 12/2014 |
| EP | 2721772 | 10/2015 |
| WO | 2009059386 | 5/2009 |
| WO | 2010003452 | 1/2010 |
| WO | 2011079358 | 7/2011 |
| WO | 2012047089 | 4/2012 |
| WO | 2012122454 | 9/2012 |
| WO | 2012142586 | 10/2012 |
| WO | 2012154938 | 11/2012 |
| WO | 2012155126 | 11/2012 |
| WO | 2013019595 | 2/2013 |
| WO | 2013028407 | 2/2013 |
| WO | 2013123445 | 8/2013 |
| WO | 2013173230 | 11/2013 |
| WO | 2014056558 | 4/2014 |
| WO | 2014091434 | 6/2014 |
| WO | 2014118622 | 8/2014 |
| WO | 2014123737 | 8/2014 |
| WO | 2014124318 | 8/2014 |
| WO | 2014130568 | 8/2014 |
| WO | 2014169018 | 10/2014 |
| WO | 2014175721 | 10/2014 |
| WO | 2015032164 | 3/2015 |
| WO | 2015046695 | 4/2015 |
| WO | 2015073687 | 5/2015 |
| WO | 2015105658 | 7/2015 |
| WO | 2015123623 | 8/2015 |
| WO | 2015131462 | 9/2015 |
| WO | 2015138447 | 9/2015 |
| WO | 2015161083 | 10/2015 |

OTHER PUBLICATIONS

Güngör, V. et al., "Smart Grid Technologies: Communication Technologies and Standards," IEEE Transactions on Industrial Informatics, vol. 7, No. 4, Nov. 2011, pp. 529-539.

Güngör, V. et al., "A Survey on Communication Networks for Electric System Automation," Feb. 2006, available at: https://smartech.gatech.edu/bitstream/handle/1853/27879/electric_system_automation.pdf.

(56) References Cited

OTHER PUBLICATIONS

Zaballos, A. et al., "Heterogeneous Communication Architecture for the Smart Grid," IEEE Network, vol. 25, No. 5, Sep./Oct. 2011, pp. 30-37, available at: http://www.itk.ntnu.no/fag/TTK4545/TTK2/Pensum-filer/SmartGrid.pdf.
Clark, A. et al., "Wireless Networks for the Smart Energy Grid: Application Aware Networks," Proceedings of the International MultiConference of Engineers and Computer Scientists, vol. 2, Mar. 17-19, 2010, available at: http://www.iaeng.org/publication/IMECS2010/IMECS2010_pp1243-1248.pdf.
Parikh, P. et al., "Opportunities and Challenges of Wireless Communication Technologies for Smart Grid Applications," 2010, available at: http://citeseerx.ist.psu.edu/viewdoc/download?doi=10.1.1.453.7100&rep=rep1&type=pdf.
Jiang, R. et al., "Energy-theft detection issues for advanced metering infrastructure in smart grid," IEEE, Tsinghua Science and Technology, vol. 19, Issue 2, Apr. 15, 2014 (16 pages).
Blumsack, S. et al., Abstract of "Ready or not, here comes the smart grid!" Energy, vol. 37, Issue 1, Jan. 2012 (pp. 61-68).
McLaughlin S. et al., "Energy theft in the advanced metering infrastructure," Abstract, Critical Information Infrastructures Security, Sep. 30, 2009 (pp. 176-187).
GridSense, "Maximize Intelligence and Minimize Costs at the Distribution Level," http://www.gridsense.com/solutions-products/transformer-monitoring/distribution-transformer-monitoring/, accessed Oct. 13, 2015, 3 pages.
Balakrishnan et al., "Models for Planning Capacity Expansion in Local Access Telecommunication Networks," Massachusetts Institute of Technology Sloan School Working Paper #3048-89-MS, Aug. 1989, 88 pages.
Corte-Real et al., "Network flow models for the local access network expansion problem," Computers & Operations Research vol. 34, 2007, pp. 1141-1157.
Bauer "Bundling, Differentiation, Alliances and Mergers: Convergence Strategies in U.S. Communication Markets," Communications & Strategies, No. 60, Dec. 2005, online at http://mpra.ub.uni-muenchen.de/25151, pp. 59-93.
Balakrishnan et al., "Models for Planning the Evolution of Local Telecommunication Networks," Massachusetts Institute of Technology Operations Research Center working paper, OR195-89, May 1989, 80 pages.
"Smart meter," http://en.wikipedia,org/wiki!Smart_meter, Nov. 10, 2009, 4 pages.
Smart Grid Northwest, "Qualitrol," http://smartgridnw.org/membership/member-organizations/qualitrol/, accessed Oct. 13, 2015, 3 pages.
Devidas, A. R. and Ramesh, M. V., "Wireless Smart Grid Design for Monitoring and Optimizing Electric Transmission in India," 2010 Fourth International Conference on Sensor Technologies and Applications, Jul. 18-25, 2010, Venice, IEEE, pp. 637-640 (2 pages).
Erol-Kantarci, M. and Mouftah, H. T., "Wireless Multimedia Sensor and Actor Networks for the Next Generation Power Grid," Ad Hog Networks, vol. 9, Issue 4, Jun. 2011, pp. 542-551 (2 pages).
Gungor, V. C., Lu, B. and Hancke, G. P., "Opportunities and Challenges of Wireless Sensor Networks in Smart Grid," IEEE Transactions on Industrial Electronics, vol. 57, No. 10, Oct. 2010, pp. 3557-3564.
Nasipuri, A. et al., "Demo Abstract: Wireless Sensor Network for Substation Monitoring: Design and Deployment," ResearchGate Conference Paper, Jan. 2008 (3 pages).

Amin, R. et al., "Roadmap to Smart Grid Technology: A Review of Smart Information and Communication System," International Journal of Control and Automation, vol. 7, No. 8, 2014, pp. 407-418.
Elyengui, S. et al., "The Enhancement of Communication Technologies and Networks for Smart Grid Applications," International Journal of Emerging Trends & Technology in Computer Science, vol. 2, issue 6, Nov. 2013, pp. 107-115.
Qin, Z., "A Survey of Networking Issues in Smart Grid," www.cse.wustl.edu/~jain/cse570-13/ftp/smrtgrid/index.html, Dec. 20, 2013 (12 pages).
Lockheed Martin, "Self-Powered Ad-hoc Network", http://www.lockheedmartin.com/us/products/span.html, accessed Nov. 9, 2015.
Owada, et al., "Design for Disaster-Tolerant and Dependable Network Architecture," ICMU 2012, pp. 136-141, Information Processing Society of Japan, 2012.
Morganthaler, et al., "UAVNet: A Mobile Wireless Mesh Network Using Unmanned Aerial Vehicles," available at http://rvs.unibe.ch/research/pub_files/MBZSA12.pdf, 2012.
Snow, "Why Drones Are the Future of the Internet of Things", Dec. 1, 2014, available at https://www.suasnews.com/2014/12/why-drones-are-the-future-of-the-internet-of-things/.
Detlef Zuehlke, "SmartFactory—Towards a factory-of-things." Annual Reviews in Control, 34.1, Mar. 28, 2010, pp. 129-138.
Artem Katasonov, et al., "Smart Semantic Middleware for the Internet of Things", Jan. 2008, 11 pages.
Andrea Zanella, et al., "Internet of Things for Smart Cities." IEEE Internet of Things Journal, vol. 1, Iss. 1, Feb. 2014, pp. 22-32.
Dieter Uckelmann, et al., "An Architectural Approach Towards the Future Internet of Things." Architecting the Internet of Things, Springer-Verlag Berlin Heidelberg, 2011, pp. 1-24.
Ning Zhong, et al., "Research challenges and perspectives on Wisdom Web of Things (W2T)." The Journal of Supercomputing, Nov. 26, 2010, 21 pages.
International Search Report and Written Opinion dated Oct. 28, 2016 issued in international patent application No. PCT/US2016/045233 (10 pages).
International Search Report and Written Opinion dated May 26, 2017 in international patent application No. PCT/US2017/019434 (10 pages).
International Search Report and Written Opinion dated Dec. 19, 2016 in international patent application No. PCT/US16/50393 (11 pages).
International Search Report and Written Opinion dated Jan. 23, 2017 in international patent application No. PCT/US2016/049245 (16 pages).
International Search Report and Written Opinion dated Jan. 19, 2017 in international patent application No. PCT/US2016/058407 (16 pages).
International Search Report and Written Opinion dated Jan. 25, 2017 in international patent application No. PCT/US2016/058383 (13 pages).
St. John, Jeff, "How Utilities Could Use Virtual Reality and Google Glass to Monitor the Grid," Mar. 3, 2015, 6 pages.
InfoBright, "Internet of Things Part 8: Smart Grids—the Future of Energy Delivery," 2014, 2 pages, https://www.infobright.com/index.php/internet-of-things-part-8-smart-grids-future-energy-delivery/#.VdHztvIVhBd.
Monnier, Olivier, "A Smarter Grid With the Internet of Things," Texas Instruments, Oct. 2013, 11 pages.
International Search Report and Written Opinion, International Application No. PCT/US2017/46991, dated Nov. 21, 2017 (8 pages).

ENHANCED REALITY SYSTEM FOR VISUALIZING, EVALUATING, DIAGNOSING, OPTIMIZING AND SERVICING SMART GRIDS AND INCORPORATED COMPONENTS

CROSS REFERENCE TO RELATED APPLICATION

This application claims benefit to U.S. provisional application No. 62/203,719, filed 11 Aug. 2015, which is hereby incorporated by reference in its entirety. The present invention forms part of, and builds on, the family of technologies disclosed in the other related applications identified below.

BACKGROUND OF THE INVENTION

1. Field of the Invention

The present invention relates to an augmented reality system for visualizing, evaluating, diagnosing, optimizing and servicing smart grids and incorporated components, and a user device for the same.

2. Brief Description of Related Art

Proliferation of the "Internet of Things" (IoT) is driving interconnected smart systems. In particular, smart grids are following this trend though the establishment of smart energy, gas and water management. Interconnected components are now providing an unprecedented level of intelligence supporting numerous operational actions. This landscape is ushering in vast amounts of unstructured data and the need for intelligent data parsing, analysis and action systems.

Delta's DSGN™ (Delta Smart Grid Network) represents an Interconnected BIG DATA analytics system providing advanced intelligence and synergistic components across power distribution, metering and optimization. The DSGNM incorporates discrete elements in transformer monitoring and communications, residential and commercial metering and analytical, predictive and pre-emptive software algorithms. The hardware associated with the DSGN™ facilitates communications with transformers, residential and commercial meters and other Internet or wirelessly connected devices {commonly referred to as the "Internet of Things"}. The DSGN's geographically disbursed assets support system optimization capabilities, some of which are in logistically difficult areas to reference, re-locate, interrogate and service. Consequently, the opportunity exists to drive substantial efficiencies in data visualization, evaluation, diagnosis, optimization, and servicing using enhanced reality systems across this interconnected smart grid network and similar networks.

SUMMARY OF THE INVENTION

The present invention relates to a head-mounted user device for use in connection with a smart grid network and its component devices. The head-mounted user device incorporates a unique, augmented and/or mixed reality display. In augmented reality, a layer of digital content is overlaid onto the natural world visible to the user. In mixed reality, virtual objects are integrated into and responsive to the natural world. In accordance with the present invention, the device is configured to provide an augmented reality display system, a mixed reality display system, or both in various applications.

In the augmented/mixed reality display of the device of the invention, the user is able to see their actual field of view, either through a transparent display screen or a display screen that is in communication with and displaying real-time images received from a camera device pointed in the user's field of view. Digital content or information is displayed to the user on the display screen by overlaying the digital content or information on top of the user's actual field of view, to create the appearance that the digital content or information may form part of their field of view and, in some cases, interact with elements in their field of view. The digital content or information may be linked with a visual cue in the user's real field of view, such as a particular location or a particular physical element. For example, the user may view digital content relating to an electricity meter or transformer in the user's vicinity and the content may be linked to the location of the meter or transformer in the user's field of view. Alternately, an installation work order may visually queue an operator to select certain physical wiring elements, located within a field of view, for installation and commissioning of a particular electrical element. With the head-mounted user device of the present invention incorporating an augmented/mixed reality display, users, such as field technicians, are able to have free use of their hands to perform work while also retaining their actual field of view to see their actual surroundings, which would not be possible in a virtual reality system or hand-held device.

The head-mounted user device represents a unique pairing of smart grid unstructured and structured data with an enhanced (augmented/mixed) reality construct. The software and hardware of the device according to the invention leverages the capabilities of data collection and evaluation assets deployed and disbursed geographically in a smart grid network. The device spatially places and registers assets within a 360 degree view while associating real-time, relative data visualizations against associated assets and systems, essentially realizing a virtual utility smart network. The spatial system registers movement of the assets within its overlaid visual enhanced reality construct as the user's location and visual reference frame change or provide interactive cues. The device provides an intuitive drill-down on assets and data visualizations using gesture, audible and input device based commands. Direct interaction with augmented/mixed reality elements may be effected using similar gesture, audible and/or input based commands. Further, the device allows real-time interaction with assets using internal interactive interfaces, device internal cameras, voice communication, geographic positioning, accelerometers, and digital gyroscopes as well as those same capabilities on wirelessly connected or paired smart devices.

The head-mounted user device is configured to provide real-time review of asset performance, as defined by the smart grid network's central system software, over-laid spatially on the display screen of the device. The identification and flagging of health indicators with locations represented will be defined spatially. As a user moves, the device will provide advisement on the real-time geographic location of assets with routing to the asset overlaid real-time on the hardware. Noting this capability, current data systems provide limited or no interaction in-field for grid or asset review. Further, many local regulations forbid the inclusion of real-time geographic routing with current systems in vehicles of installers and technicians, which inhibits active routing. Additionally, available in-field data systems are cumbersome, unwieldy and limited in their capability for interaction with human factors, precluding their use by many field technicians. The head-mounted user device resolves this customer pain-point, while providing additional functionality. As noted, the augmented/mixed reality interface allows direct interaction with both overlaid elements and in-field assets using gesture, audible or input device based interaction.

The head-mounted user device provides overlaid instructions and interactive geometric element based representations for asset installation on transformer, residential or commercial locations. These instructions provide interactive and virtual cues overlaid on the surroundings in the user's field of view, while also providing a virtual keyboard for asset set-up. Upon installation, visual verification may be confirmed via a camera on the device, stored in a memory of the device and/or stored remotely via a cloud based data storage structure.

As overheating of assets may occur if improperly installed, the device provides in-field temperature verification via linking with hand-held devices which incorporate temperature profiling capabilities. Current methodologies and devices do not include digital capabilities for overlaying installation instructions upon points of installation. Further, in many cases, installers must record both the location and a picture of the installation for verification purposes. The methodology afforded by the head-mounted user device reduces the equipment required for this procedure while also providing efficiency improvements on the recording, localization and verification of installations against current requirements. During in-field product replacements, similar procedures must be followed for product decommissioning, final reads, picture of product and identifiers, and ultimately disposal. The device of the present invention allows the direct action of these activities, in the field, without the need to return the asset to a central location for review and disposition. Recognizing the temperature profiling capability above, "Hot Socket" situations in-field create a liability associated with potential fires and may be inhibited through the use of hardware temperature profiling capabilities and picture recording. The combination of these activities with the device allows the identification and remediation of potential loose meter socket situations.

Energy diversion represents a major issue within many emerging markets. Data collected from the smart grid network identifies assets exhibiting energy diversion situations. Using spatial overlays, the head-mounted user device guides in-field technicians to points of diversion for scheduled remediation. The device also identifies potential issues associated with the location(s) of diversion. No other system or hardware products offer such capability or flexibility. In some cases, the theft of assets that have been located within a smart grid installation may be visualized, localized and actioned for recovery using the internal GPS units within these devices and the augmented/mixed reality routing capability afforded by the device.

The device is inclusive of either a singular or full eye wrap, head-up display, internal microphones, headphones, one or more cameras and wireless connectivity including but not limited to Bluetooth, 3G, 4G and other, supporting the device's display. An ergonomically tuned head strap and facial support are provided to aid in wearability and comfort. In some cases, the device may be directly integrated into personal protection equipment, e.g. hard hats, protective suits, and similar.

In accordance with a first aspect of the invention, a head-mounted user device is provided. The head-mounted user device comprises a signal processor configured to receive signaling containing information about one or more assets in a distributed power grid network from a data collection device configured to receive data from the assets in the distributed power grid network; and to determine, based at least partly on the signaling received from the data collection device, signaling containing asset display information about the one or more assets. The head-mounted user device also comprises an augmented or mixed reality display configured to display an actual field of view of the user and the asset display information by overlaying the asset display information over the actual field of view; and means for mounting the device to the head of the user such that the display is in the user's field of view. The head-mounted user device may further comprise means for providing user inputs to the head-mounted user device.

In accordance with an embodiment of the head-mounted user device of the first aspect of the invention, the asset display information includes a real-time review of asset performance. Further in accordance with an embodiment of the head-mounted user device of the first aspect of the invention, the received signaling containing information about one or more assets includes information about the geographic position of the one or more assets; and the signal processor of the head-mounted user device is further configured to determine the location of the one or more assets relative to the head-mounted user device based on the received information, and is configured to update the location of the one or more assets relative to the head-mounted user device as the user wearing the head-mounted user device moves or as an asset is relocated to another location, either authorized or non-authorized. The asset display information may include identification and flagging of health indicators of the one or more assets together with the location of the one or more assets. The asset display information includes routing information directing the user to the asset overlaid on the display.

In accordance with a further embodiment of the head-mounted user device of the first aspect of the invention, the asset display information includes overlaid instructions for asset installation on the transformer and residential/commercial metering locations, including interactive and virtual cues to be overlaid over the field of view, including a virtual keyboard for asset set-up.

In accordance further with the first aspect of the invention, the head-mounted user device comprises comprising at least one forward facing camera mounted in front for receiving images and one or more additional cameras mounted around the device periphery. The at least one forward facing camera may be configured to capture real-time images of the user's environment in the user's field of view, and the display may be configured to display the real-time images of the user's environment in the user's field of view, onto which the information about said geo-spatial assets is overlaid. In one embodiment of the head-mounted user device, the means for mounting comprises an adjustable head strap. The head-mounted user device may further comprise a microphone configured to receive voice commands from the user.

In accordance with a further embodiment of the head-mounted user device of the first aspect of the invention, the asset display information includes information about an asset routing identification comprising a map directing the user of the head-mounted device to the asset on a recommended route determined by the signal processor and/or other algorithms as may be available via a wireless connection. The asset display information may further include an asset radar that provides a summary of locations of a plurality of assets, within specified distance increments from the head-mounted user device, which is displayed in the center of the asset radar. The asset display information may further include information about geo-spatial asset overlay that identifies assets by type overlaid on the field of view, including where relative size of the asset display information varies in proximity to the user. The asset display information may further include information about geo-spatial asset selected that provides a complete overview on performance data throughput, health and location. The asset display information may further include information about asset installation, set-up and visual verification, including where a targeted asset is visual through the device's enhanced reality field of view.

In accordance with a further embodiment of the head-mounted user device, the data collection device is a transformer mounted data collection device configured to receive signaling containing information about collected data, including some combination of electrical signaling data related to electrical signaling being processed by the transformer located and arranged in the distributed smart grid network and to which the data collection device is mounted, metered data related to associated electrical signaling being provided from the transformer to a building or structure in the distributed smart grid network, and other wireless network data related to other wireless network communication devices/nodes/end points deployed in the distributed smart grid network.

In accordance with a further embodiment of the head-mounted user device of the present invention, the augmented or mixed reality display comprises a transparent display screen configured to allow the user to see the actual field of view through the transparent display screen and to display the asset display information.

In accordance with a further embodiment of the present invention, the head-mounted user device comprises a hand-held controller device configured to permit user interaction with the head-mounted user device.

In accordance with a second aspect of the invention, an apparatus is provided, comprising a signal processor. The signal processor is configured to receive signaling containing information about geo-spatial assets that is received from transformer and residential/commercial metering locations interconnected by Internet/wireless connected devices in a distributed power grid network, and determine corresponding signaling containing information about the geo-spatial assets for providing on a real-time visual display on a visor of eyewear to be worn by a field technician.

In accordance with the second aspect of the invention, the information allows for interaction in-field for grid and asset review as well as asset interaction and modification. The information may further include a real-time review of asset performance for overlaying spatially on the visor. The information may further include identification and flagging of health indicators with locations represented and defined spatially. The information may further include advisements on the real-time location of the geo-spatial assets with routing overlaid on the visor. The information may include overlaid instructions and interactive geometric element based representations for asset installation on the transformer and residential/commercial metering locations, including interactive and virtual cues to be overlaid over the field of view, including a virtual keyboard for asset set-up.

In accordance further with the second aspect of the invention, the apparatus may comprise the eyewear having the visor for displaying geo-spatial information overlaid on view through glasses. The eyewear may further comprise multiple cameras mounted along the periphery for receiving images. The eyewear may further comprise an adjustable head strap for coupling the eyewear on the head of the field technician. The eyewear may further comprise a microphone for providing audio spoken by the field technician and headphones for providing corresponding audio to the field technician.

In accordance further with the second aspect of the invention, the signaling includes information about an asset routing identification of a targeted asset that provides direct, real-time, auto-updating routing from a user's current location. The signaling may further include information about asset radar that provides a summary of asset location, within specified distance increments, including colored information or icons related to different assets, colored items that represent potential occurrences of energy diversion, green items related to healthy assets, yellow items related to assets that have potential health issues. The signaling may further include information about geo-spatial asset overlay that identifies assets by type overlaid on the field of view, including where relative size varies in proximity to the user, or where assets are user selectable with drill-down capability. The signaling includes information about geo-spatial asset selected that provides a complete overview on performance data throughput, health and location. The signaling includes information about asset installation, set-up and visual verification, including where a targeted asset is visual through the device's enhanced reality field of view.

BRIEF DESCRIPTION OF THE DRAWING

The application includes the following Figures, which are not necessarily drawn to scale.

DETAILED DESCRIPTION OF THE INVENTION

Figure 1A:
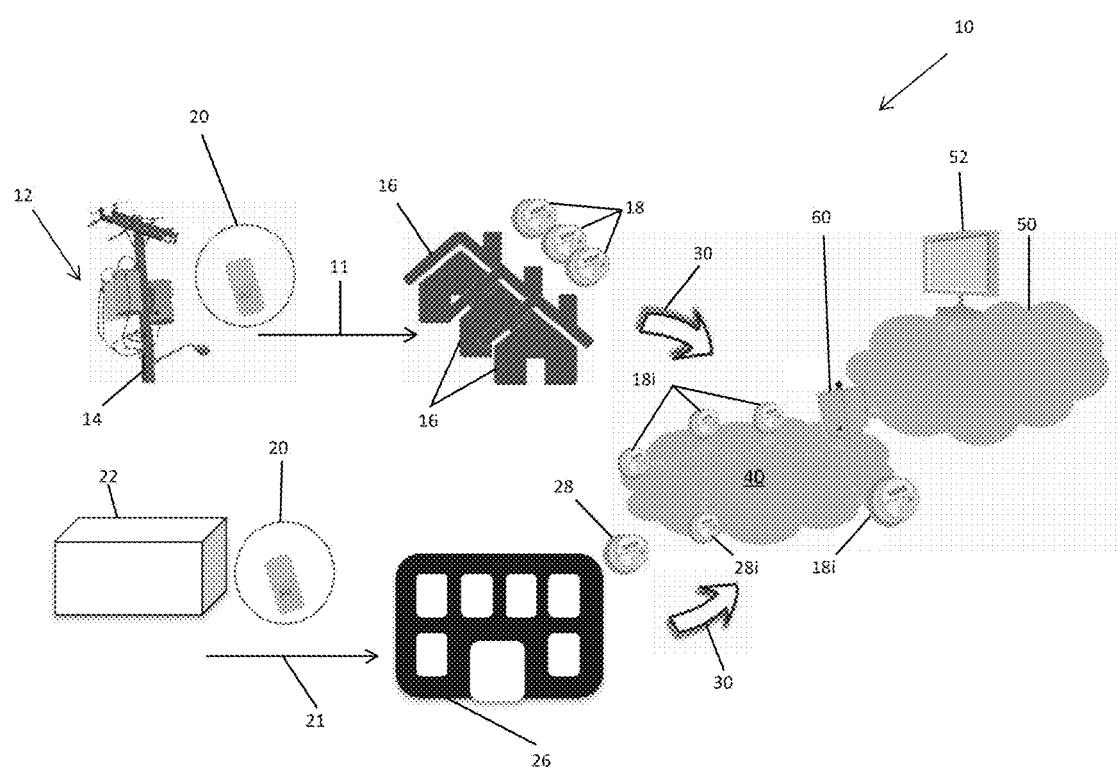
FIG. 1A is a diagram of a smart power grid network having a transformer monitor/data collection device, according to some embodiments of the present invention.
Figure 1B:
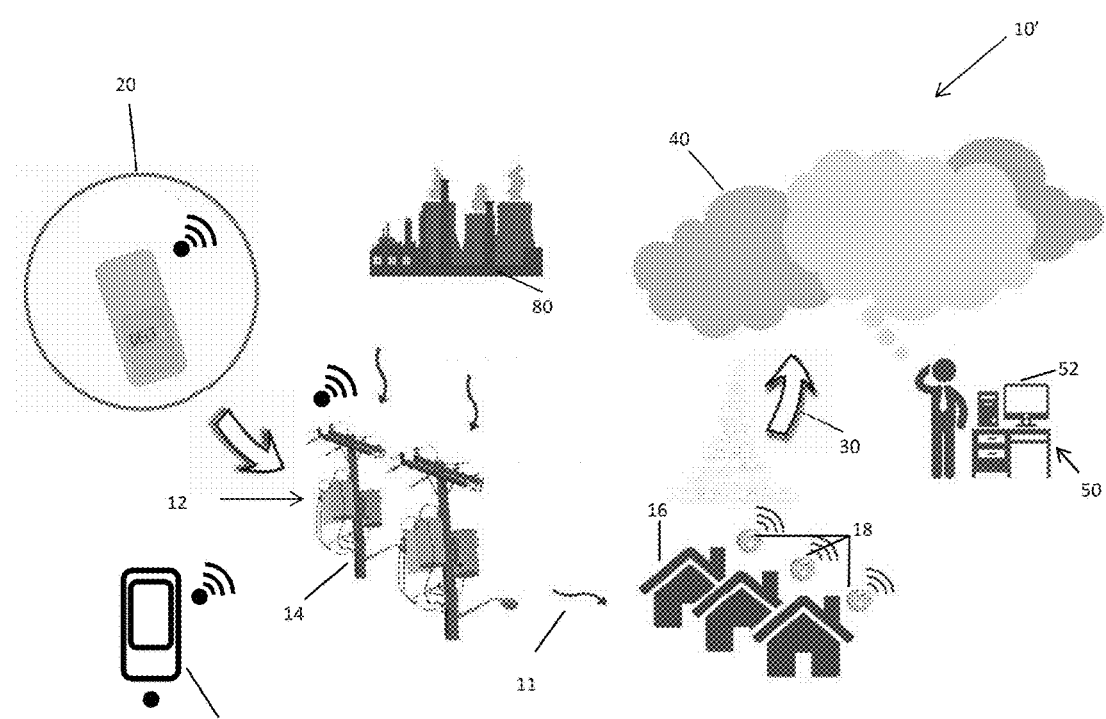
FIG. 1B is a diagram of a smart power grid network having a transformer monitor/data collection device, according to some embodiments of the present invention.
Figure 2:
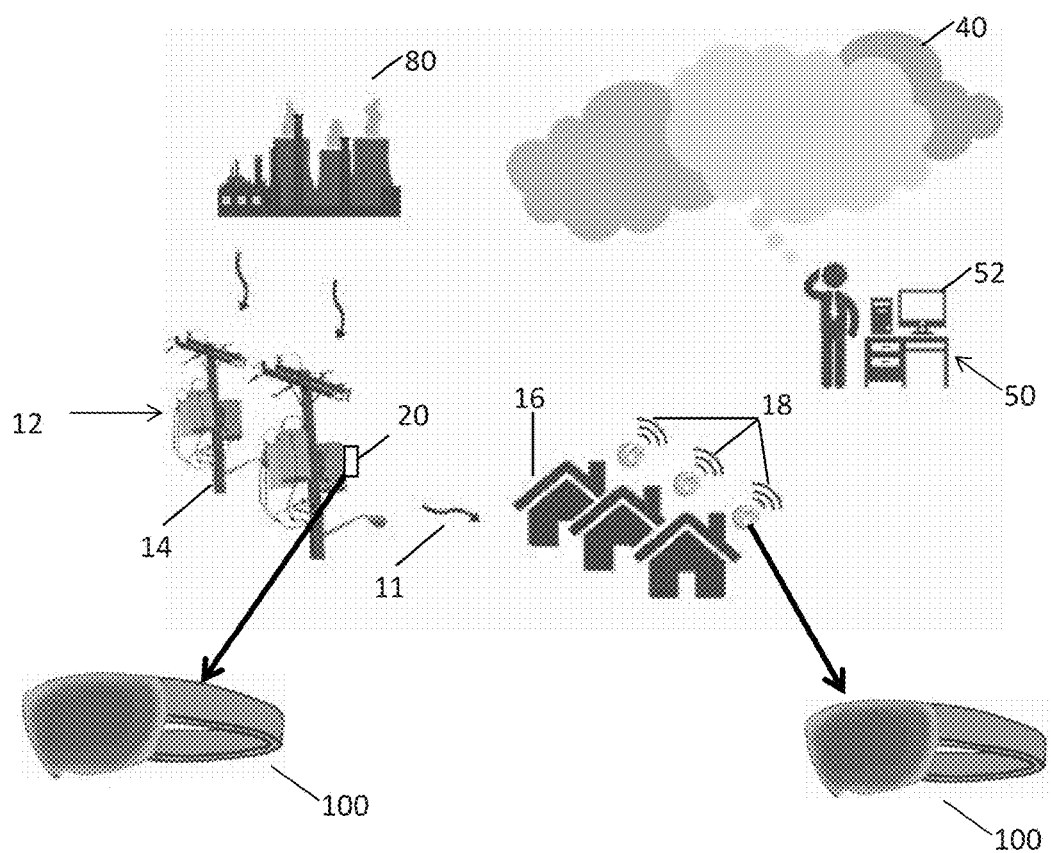
FIG. 2 is a diagram of a smart power grid network including the head-mounted user device, according to some embodiments of the present invention.

FIGS. 1A and 1B

FIGS. 1A and 1B show big picture renditions of the overall smart power grid network, e.g., as a configuration/ establishment of a baseline, power grid centric, smart utility mesh network, for implementing a pole mounted or pad mounted transformer monitor/smart data collector device according to the present invention to communicate upstream and downstream within the network.

The overall smart power grid network represents an interconnected so-called "BIG DATA" technology system providing advanced intelligence and synergistic components across power metering, distribution, communication, optimization, installation and servicing. The network incorporates discrete elements in the transformer monitoring and communications, residential and commercial metering and analytical, predictive and pre-emptive software algorithms. The hardware associated with the network facilitates communications with transformers, residential and commercial meters, and other Internet/wireless connected devices {commonly referred to as the "Internet of Things"}. The network's geographically disbursed assets support a wireless mesh network communications extension, while aiding system optimization capabilities, noting that many assets are in logistically difficult areas to reference, re-locate, interrogate and service. The overall integrated system drives substantial efficiencies in data visualization, evaluation, diagnosis, optimization, and servicing using enhanced reality systems across this interconnected smart grid network and similar networks. The collective systems provide a synergistic and unique alternative network for BtB (business-to-business) and BtC (business-to-consumer) data receipt and delivery.

The smart grid network according to the present invention represents a singular, standardized, and scalable network, providing the industry's first inclusive solution from a singular supplier. The smart grid network is inclusive of four basic technology elements. The primary hardware and software constituents of the network are as noted and identified below.

1. The pole or pad mounted transformer monitor/smart data collector device is identified herein as element 20 (AKA as "HyperSprout™" (and formerly known as "iTM™")), which is the localized data aggregation and power flow investigation; establishing a data capture and delivery capability wherever there is power, e.g., consistent with that set forth in U.S. application Ser. No. 15/160,754, which is hereby incorporated by reference in its entirety.

2. A digital data and delivery and receipt mesh network (AKA "DataVINE™" (formerly known as ("iAMI™")) is identified herein as element 40, which is a ubiquitous mesh network facilitating automated residential and commercial metering while deploying an alternative data delivery capability; enforcing a market leading 100% meter read capability, e.g., consistent with that set forth in U.S. application Ser. No. 62/236,420, as well as U.S. provisional application Ser. No. 62/244,919, and U.S. provisional application Ser. No. 62/299,348, each of which are hereby incorporated by reference in their entireties.

3. A smart node power grid communication protocol (AKA "DataSCAPE™" (formerly known as "iDAP™")), which provides for a comprehensive nodal exchange analysis of all grid parameters; realizing an inclusive geo-spatial understanding of utility operations, e.g., consistent with that set forth in U.S. provisional application Ser. No. 62/205,358, which is hereby incorporated by reference in its entirety.

4. A head-mounted interaction and servicing device 100, which is shown in FIGS. 2-8 and described herein.

Taken collectively, this energy and communications portfolio and financial strategy improves over current offerings through its intimate understanding of utility partners' pain points, core needs and anticipated delights. Most importantly, the network hardware and software solution allows for the identification of the purposeful diversion of energy {i.e., theft} and the focused remediation of the offending areas or subjects, subsequently enhancing enterprise revenues.

As noted, the aforementioned overall combination provides an infinitely scalable data delivery and receipt capability for communities with poorly established, historical infrastructure while providing a synergistic network capability to those communities with current cellular capability.

By way of example, FIGS. 1A and 1B show examples of smart power grid networks generally indicated as 10 and 10', in accordance with some embodiments of the present invention. By way of example, the smart power grid networks may take the form of, or may be configured to include, one or more digital data and delivery and receipt mesh networks like element 40. Each digital data and delivery and receipt mesh network 40 includes communication nodes such as the transformer module or device 20 for exchanging information upstream and downstream between the communication nodes and the central location, which takes the form of the private network 50 in FIGS. 1A and 1B. Communication nodes are configured to be able exchange such upstream and downstream information between themselves in order to exchange such upstream and downstream information between a respective communication node and the central location. Represented within this figure is the concept of a data storage "cloud." The cloud represents an external digital storage media and/or series of storage devices, accessible via multiple wireless connectivity methodologies and useable as a vehicle for delivering smart grid parameters to multiple assets within the smart grid, e.g. smart node power grid communication protocol, head-mounted user device, and other associated and non-associated elements. In FIGS. 1A and 1B, similar elements are provided with similar reference labels.

In FIGS. 1A and 1B, the smart power grid networks 10, 10' include transformers like elements 12, 22 for providing electric energy to residential homes and commercial buildings like elements 16, 26, each having a respective electrical meter like elements 18, 28 for measuring the associated electrical energy usage. The smart power grid networks 10, 10' also include transformer monitor/data collection devices 20 configured to collect data about the electrical energy usage in relation to residential homes and commercial buildings 16, 26 from the respective electrical meter like elements 18, 28. For example, each electrical meter 18, 28 may provide metered data signaling containing information about metered data related to associated electrical signaling being supplied from the transformer 12, 22 to the building or structure 16, 26 in the grid network 10, 10'. Moreover, transformer monitor/data collection devices 20 may receive associated signaling containing information about electrical signaling data related to electricity being processed by the transformer 12, 22 located and arranged in the grid network and to which the transformer monitoring device is mounted, as well as other wireless network data related to other communication nodes/end points forming part of other wireless network devices deployed in the grid network. In effect, the collected data received by the transformer monitor device 20 may include some combination of the electrical signaling data related to the transformer, the metered data related to the electrical meter and/or the other wireless network data related to other communication nodes/end points in the grid network.

The transformer monitor/data collection devices 20 are also configured to provide suitable signaling 30 containing information about the collected data to a private network 50 via the digital data and delivery and receipt mesh network 40. The private network 50 is configured as a central point that processes the collected data, e.g., performing utility analysis that may include one or more of the following: delivery subtraction analysis, proactive asset monitoring, distribution asset utilization, T and D subtraction analysis, energy audits and analysis, load control, and geographic localization. This central point may exist in a cloud environment, accessible via multiple wireless connectivity or wired connectivity methodologies. By way of example, the utility analysis is performed in an effort to increase efficiency, decrease costs, increase profits and/or community engagement related to the operation of the smart grid network.

FIGS. 1A and 1B shows a pole mounted transformer device 20 in communication with the electrical meter 18 associated with the residential home 16. By way of example, the electrical meter 18 may be configured to measure single phase electrical energy provided by the transformer 12, mounted to a pole 14, along a single phase utility line 11 to the residential home 16.

FIG. 1A also shows a pad mounted transformer device 20 in communication with the electrical meter 28 associated with the commercial building 26. By way of example, the electrical meter 28 may be configured to measure three (3) phase electrical energy provided by the pad transformer 22 along a three (3) phase utility line 21 to the commercial building home 26. FIG. 1B also shows a power utility 80 configured to provide the electrical energy in the smart grid network 10'.

FIG. 1B shows that the transformer device 20 may be configured to collect data related to some distribution related functionality, e.g., including determinations related to outage, momentary outage, voltage/VAR, and/or transformer monitoring. FIG. 1B shows that the transformer device 20 may be configured to collect data related to some voltage analysis, DRM (digital rights management) functionality and energy theft functionality in relation to its associated residential home or commercial building. The transformer device 20 provides the suitable signaling 30 containing information about the collected data to the private network 50 via the digital data and delivery and receipt mesh network 40. The collected data received by the private network 50 may also be analyzed in relation to conservation, load curtailment and/or a demand response vis-a-vis the power utility 80. In FIG. 1B, the private network 50 may include a private network computer and monitor generally indicated as 52 for performing or implementing the aforementioned analysis and functionality. In many cases this private network computer and monitor may be accessing the noted smart grid data via a cloud environment, accessible via multiple wireless connectivity or wired connectivity methodologies. FIG. 1B also shows both the receipt and transmission of digital data across the defined wireless mesh network to a representative IoT device indicated as 53, e.g., which may take the form of a smart phone, tablet, computer, laptop, etc.

FIG. 1A shows that the digital data and delivery and receipt mesh network 40 may include other transformer devices like element 20 exchanging information with other meters like elements 18i, 28i associated with other buildings or structures like elements 16, 26.

FIG. 1A also shows a relay 60 coupled between the digital data and delivery and receipt mesh network 40 and the private network 50. By way of example, the relay 60 is shown as 5 GHz relay for communicating with a corresponding 5 GHZ private network 50, although the scope of the invention is not intended to be limited to any particular frequency or transmissions/receipt media for the relay or network.

FIG. 2

A head-mounted user device 100 is provided in accordance with the present invention, which is configured for use with the smart grid network 10 or 10' and its component elements. The head-mounted user device 100 is configured for visualizing, evaluating, diagnosing, optimizing and servicing the smart grid network 10 and the assets contained within the smart grid network 10 or 10'. As used herein, the term "asset" or "assets" may refer to any device that may form part of the smart grid network 10 or 10' or be used in the maintenance or monitoring of the smart grid network 10 or 10', including but not limited to, transformer monitor device 20, electric meters 18, additional heat-mounted user devices 100, substation monitors, electromagnetic pulse detection devices, mobile devices identified in the network (e.g., utility vehicles technicians and digital devices associated therewith), geographically fixed items identified in the network (e.g., telephone poles, junction points, commercial or residential structures), IoT devices 53, and networks formed by the aforementioned devices, including mesh network 40, as well as other items not associated with the smart grid network or other IoT devices, but for which there is established a referenced geo-location or moving/variable coordinate capability.

The head-mounted user device 100 is configured for communication with assets in the smart grid network 10, such as transformer mounted data collection devices 20 and electric meters 18. The head-mounted user device 100 receives information from and about the assets in the smart grid network 10, and displays information on a display screen 102 of the device 100 in user's line of sight. The user of the head-mounted device 100 may be, for example, a field technician or a system installer.

A transformer mounted data collection device 20 transmits signaling to the head-mounted user device 100, which contains information about the performance of assets in the smart grid network 10. This transmission may be occurring directly from the referenced private network or indirectly via the referenced cloud environment. The user of the head-mounted user device 100 is therefore able to track and monitor the performance of assets in the smart grid network 10 while working in the field. The information transmitted from the transformer mounted data collection device 20 also may include information about the location of assets in the smart grid network 10, such as the GPS coordinates of the asset. The head-mounted user device 100 comprises a geographic positioning component configured to determine the GPS coordinates of device 100. As such, the processor 110 of the device 100 is configured to determine the locations of assets relative to the device 100. This location information can be displayed to the user in a variety of manners, including for example, a radar-like display which displays to the user the distance and direction to one or more assets, or routing information, which displays to the user a route from the current position of the user wearing the device 100 to the asset onto a map. The head-mounted user device 100 is configured to track the movement of the device 100, and for any asset that is not in a fixed location, the head-mounted user device 100 also receives updated positioning information for the asset. As such, the location information displayed by the device 100 can be updated on a real-time basis to reflect the movement of the user and device 100.

While the head-mounted device 100 is configured to receive information from the transformer mounted data collection device 20 regarding, for example, multiple electric meters 18 in a smart grid network 10, the head-mounted device 100 may also be configured to interact directly with assets such as an electric meter 18. The head-mounted device 100 can be configured to interact with the electric meter 18, or another asset, during installation or repair of the electric meter 18, for example.

Figure 3A:
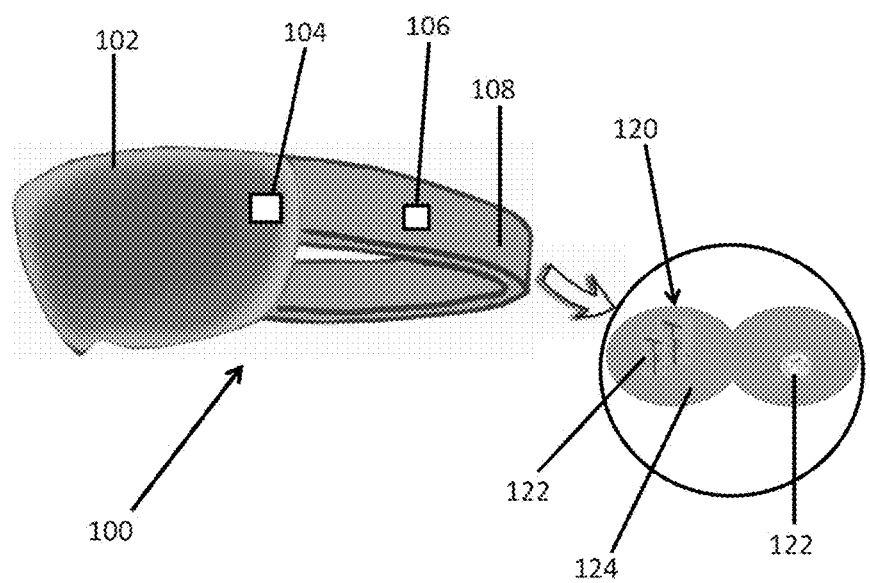
FIG. 3A is a diagram of the head-mounted user device, according to some embodiments of the present invention.
Figure 3B:
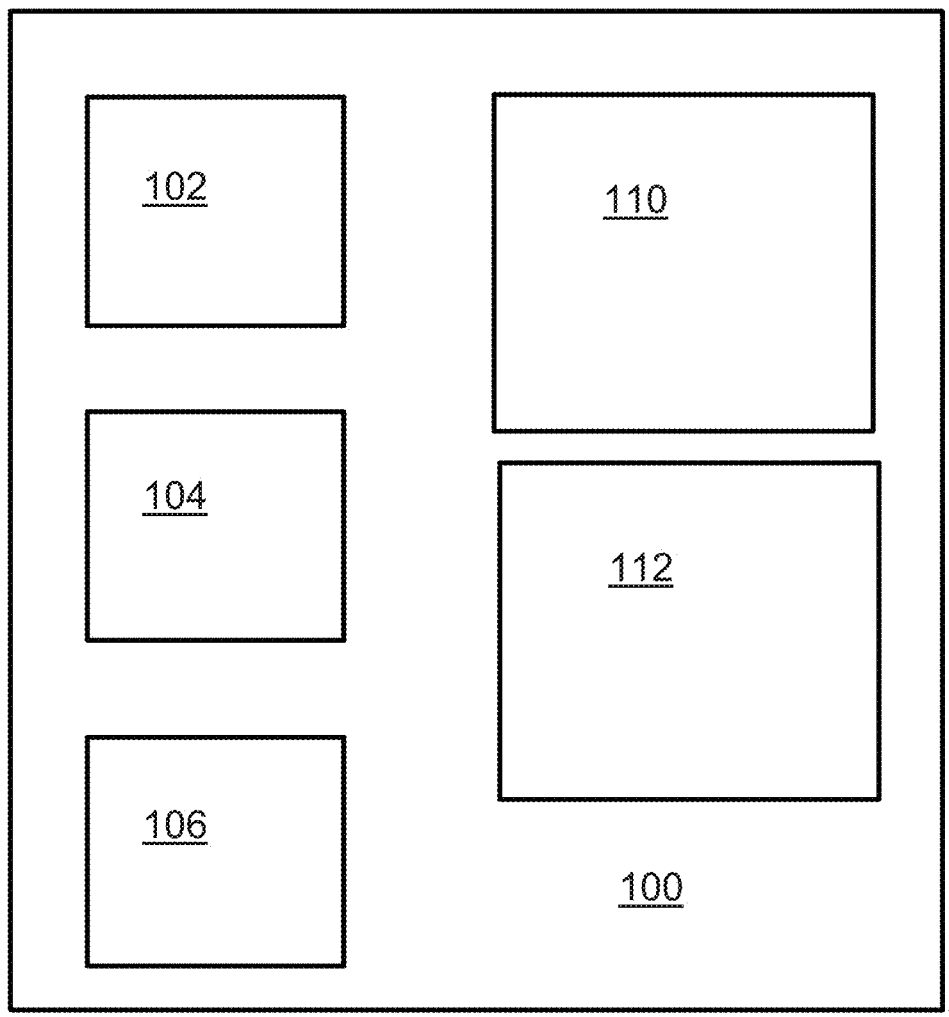
FIG. 3B is a diagram of the head-mounted user device, according to some embodiments of the present invention.

FIGS. 3A and 3B

The head mounted user device 100 in accordance with one embodiment of the present invention is shown in FIGS. 3A and 3B.

The head mounted user device 100 may comprise a display screen 102, a camera 104, a microphone and headphone 106, a means 108 for mounting the device to the head of the user, a signal processor 110 and memory 112, in addition to other components. FIG. 3B shows, for example, a block diagram of a head-mounted user device 100 including a display screen 102, a camera 104, a microphone and headphone 106, a signal processor 110 and memory 112, each of which can be connected to and in communication with each other in the operation of the device 100.

The display 102 is an augmented/mixed reality display configured to display geo-spatial information about assets, overlaid on the environment or surroundings that are seen in the user's field of view. In accordance with one embodiment, the display 102 is fully transparent, such that the user can see directly through the display 102 to directly observe his or her surroundings. The augmented reality display 102 is configured to display information about the assets by presenting the asset information over the user's surroundings visible through the transparency of the display 102. In accordance with a further embodiment, the display 102 is a non-transparent display screen. In this embodiment, the camera 104 of the device 100 is positioned on the outer surface of the device 100, as shown for example in FIG. 3A. The camera 104 is configured to capture real-time video images of the user's field of view. The screen of the display 102 is positioned on an inner surface of the device 100, directly in front of the user's eyes, and is configured to receive and display the real-time images being captured by the camera 104. The user is therefore seeing the environment in his or her field of view indirectly, by way of the camera 104 in combination with the screen of the display 102. Asset information is then displayed to the user on the screen of the display 102 by overlaying the asset information on top of the field of view images being captured by the camera 104.

An example of the viewpoint 120 of the user wearing the head-mounted user device 100 is shown in FIG. 3A. Asset information 122 is displayed to the user on the display in a manner that positions the information 122 over the environment and surroundings that are in the user's field of view 124.

The camera 104 may be in the form of a forward facing camera mounted in the front of the device 100 for capturing images that are within the field of view of the user wearing the device 100, as previously described, or multiple cameras around the periphery of the device. The camera 104 may be further configured to record still or video images, which can be stored in the memory 112 of the device 100 and/or transmitted by the device 100 to an external storage device, in many cases a cloud storage system. The camera 104 may further be configured to take thermal imagery, which can be used, for example, to determine if an asset is overheated.

A microphone and headphones 106 may be provided as an integrated component, or as separate components on the device. The microphone and headphones 106 are configured to allow the user to interact with system, by allowing the user to provide audio input through the microphone and receive audio feedback through the headphones. The microphone 106 may be configured to receive voice commands from the user, which may, for example, instruct the head-mounted user device 100 to display a particular type of information for a particular asset. The user provides a voice command, which is received by the microphone 106. The voice command is processed by the signal processor 110. The signal processor 110 determines the action that is to be taken in view of the instructed voice command, and then executes the command, instructing the display 102 to display the requested information. The present invention is not intended to be limited to any particular format or location of the microphone and headphones 106, but may take the form of any suitable microphone and headphone known in the art.

The means 108 for mounting may be in the form of an ergonomic and adjustable head strap, which can be wrapped around the user's head and adjusted manually for fit. In alternative embodiments, where the device 100 is in the form of glasses, the means 108 for mounting can be the frame of the glasses and for securing behind the ears of the user. The means 108 may also be in the form of a helmet, or item of headwear, or head portion of a suit, that is worn on the user's head and which integrate the device 100. In certain embodiments, the device 100 may be in the form of a lens placed directly on the user's eye, in which case the lens also serves as the means 108 for mounting the device 100 to the user. The means 108 for mounting the device 100 to the head of the user are not intended to be limited to these examples, but may be in the form of other suitable head-mounting means known in the art.

The head-mounted user device 100 further includes a signal processor 110 and memory 112. The non-transitory memory 112 stores computer program code, which when executed by the signal processor 110, causes the signal processor 110 to implement various of the functions of the head-mounted user device 100 described herein, including the augmented/mixed reality display of asset information overlaid onto the user's field of view on the display 102 and the determination of asset information to be displayed on the display 102 based on the received signaling information from the transformer mounted data collection device 20. The memory 112 may also be configured to further store information received by the processor 110 of the head-mounted device 100 from assets in the smart grid network and user collected data, such as images recorded by the camera 104.

Memory 112 may also be configured to store information and signaling received from another device or a server for loading in the field.

The head-mounted user device 100 can be powered by means known in the art suitable for such devices, including but not limited to, a rechargeable battery that can be recharged while the device 100 is not in use by plugging the device 100 into a standard electrical outlet with a power cord received by an input on the device 100, or a replaceable battery.

The head-mounted user device 100 comprises additional components that are used in the generation of the augmented/mixed reality system shown on the display 102, including a gyroscope configured to detect the physical orientation and positioning of the head-mounted user device 100, a geographic positioning or GPS component configured to determine the geographic location of the head-mounted user device 100, an accelerometer configured to detect the acceleration of the head-mounted user device 100 when worn by a user in motion and a digital compass configured to determine the direction of movement of the head-mounted user device 100.

The head-mounted user device 100 may comprise a plurality of means for providing user input and enabling user interaction with the device. The head-mounted user device 100 includes a microphone 106, as described previously, which is configured to receive voice input from the user. The user may use the microphone 106 to provide vocal instructions to the head-mounted user device 100 to proceed through prompts or to display certain categories of information, for example. A separate, controller device may also be provided. In a preferred embodiment, the controller device is a small device in communication with the head-mounted user device 100, which can fit into the pocket of the user. The controller device is hand operated by the user and comprises a plurality of user inputs, and may allow the user to scroll through prompts, select items from prompts, or provide any other type of user input that is received and processed by the head-mounted user device 100. The head-mounted user device 100 is also configured to provide to the user a virtual keyboard 126. The virtual keyboard 126 is displayed on the augmented reality display 102, overlaid onto the user's field of view. The user can make selections on the virtual keyboard 126 with his or her fingers by placing his or her fingers where the particular input button of the keyboard appears in the field of view. The gyroscope of the head-mounted user device 100 is configured to determine the physical orientation and positioning of the device 100, and the camera 104 is configured to detect the movement and location of the user's fingers. The processor 110 is configured to receive input from the gyroscope and the camera 104 about the position of the device and the movement/location of the user's fingers, and determine the appropriate selection from the virtual keyboard 126 by determining the location of the user's finger relative to the position of the device 100 and where the user's finger would align with the virtual keyboard 126 as it would appear to the user.

The head-mounted user device 100 can take the form of other head-mounted user devices comprising augmented reality displays known in the art. In alternative embodiments of the present invention, the user device 100 can take alternative forms, which are not head mounted. For example, a user device that is not designed to be worn on the head of the user can be provided including a display, camera, microphone, headphone, signal processor and memory consistent with that described above, such as in the form of a personal computer, tablet computer or mobile device.

FIG. 4

Figure 4:
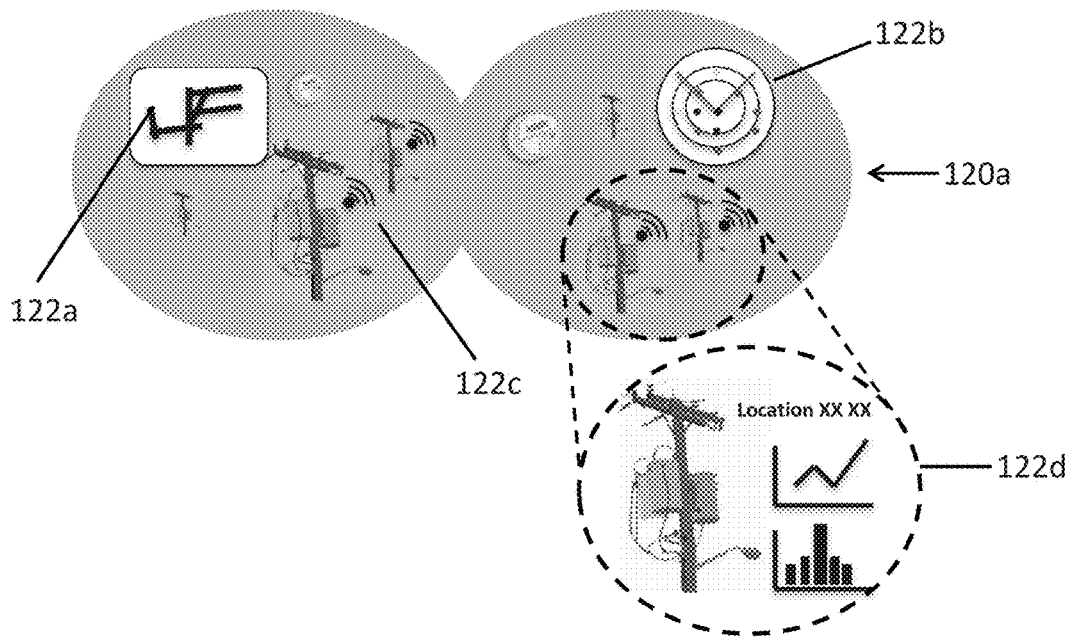
FIG. 4 is a diagram of a visual display presented on the head-mounted user device, according to some embodiments of the present invention, including geo-spatial asset performance, health and location advisement.

FIG. 4 shows various types of asset information 122 that can be displayed on the display 102 in accordance with the enhanced or augmented reality display system described herein. In particular, the asset information 122 shown in FIG. 4 relates to geo-spatial asset performance, health and location.

As previously described, the exact location of an asset is communicated to the processor 110 of the head-mounted device 100. The head-mounted user device 100 is configured to determine the location of the asset relative to the head-mounted user device 100 by determining the location of the asset, determining the location of the head-mounted user device 100, comparing the location of the asset with the location of the head-mounted user device 100, and determining the distance and/or route from between the two locations. The relative location of the asset may be displayed to the user on the display 102 in one or more different formats.

A route from the user/head-mounted user device 100 to a particular asset may be displayed in the form of asset routing information 122a. The asset routing information 122a includes an identification of the targeted asset and provides direct routing from the user's current location to the asset, while automatically updating the route as the user/head-mounted user device 100 changes locations. The memory 112 of the device 100 may store map information for a particular area, or may be configured to retrieve map information that is stored externally. The locations of the particular asset and of the head-mounted user device 100 are identified and placed on to a map, and an appropriate route is determined and displayed to the user on the display 102 as a recommended route. As the head-mounted user device 100 moves, the changing location of the head-mounted user device 100 is detected, and the route modified to show such movement or to change the route, in the event that the user has moved to a location where a different route than the originally recommended route becomes advisable.

The relative location of one or more assets can be further displayed in the form of asset radar information 122b. Asset radar information 122b provides a summary of asset locations, within specified distance increments of the user and the direction of the assets from the user's perspective. Asset radar information 122b can be displayed on the display 102 in a format that includes a series of concentric circles with the position of the head-mounted device 100 identified in the center, and the various assets positioned around the center in a 360-degree panorama. The compass direction that the user/head-mounted user device 100 is facing is determined, and the relative distance and direction of the asset from the device 100 is also determined. The assets are then positioned on the asset radar 122b accordingly, with closer assets placed closer to the center of the asset radar 122b. To provide the user with additional useful information about the assets shown in the asset radar information 122b, different assets can be color coded or noted by discrete icons on the display 102. For example, in one embodiment, red items may represent instances of potential energy diversion, green items may represent healthy assets without any problems or issues, and yellow items may represent assets with potential issues.

Geo-spatial asset overlay information 122c identifies assets by type, and is overlaid on the user's field of view. Geo-spatial asset overlay information 122c can be determined by the processor 110 of the device by defining a geographic area or smart grid network, and identifying the assets in the area or network. The locations of the assets are determined and the assets can be classified by their type (e.g., electricity meter 18, transformer mounted data collection device 20). A command is provided by the user to display assets of a particular class or type, which is processed by the processor 110 of the device. The processor 110 places the assets of the selected class or type on a map of the geographic area or smart grid network, which is displayed to the user on the augmented/mixed reality display 102. Alternatively, the assets of the selected class or type can be associated with their geographic location and an identifying icon is displayed over the location of the asset, such that when an asset is in the user's field of view, an identifying icon is displayed to the user over the location. A particular icon may be provided to identify a particular type of asset, and the relative size of the icon may vary depending on proximity of the asset to user (i.e., as the user becomes closer to the asset, the icon becomes larger). All assets are user selectable with drill-down capability in order to obtain more particular information about the asset and its performance data. A selected asset can be noted as such in the asset radar information 122*b*.

Asset selection information 122*d* may also be displayed. Selecting an asset provides a complete overview on its performance, data throughput, health and location. An asset can be selected by receiving a command from the user to select an asset to display asset selection information 122*d*, determining by the processor 110 which asset out of a collection of assets in a geographic area or smart grid network has been selected, and displaying the asset selection information 122*d* on the augmented reality display 102 over the user's field of view. All parameters relating to the asset may be drilled down further to provide additional information to the user. Upon selection of an asset, asset routing information 122*a* and asset radar information 122*b* can be adjusted accordingly to show a route to the asset in asset routing information 122*a* and add the asset to the asset radar information 122*b*, if necessary.

FIG. 5

Figure 5:
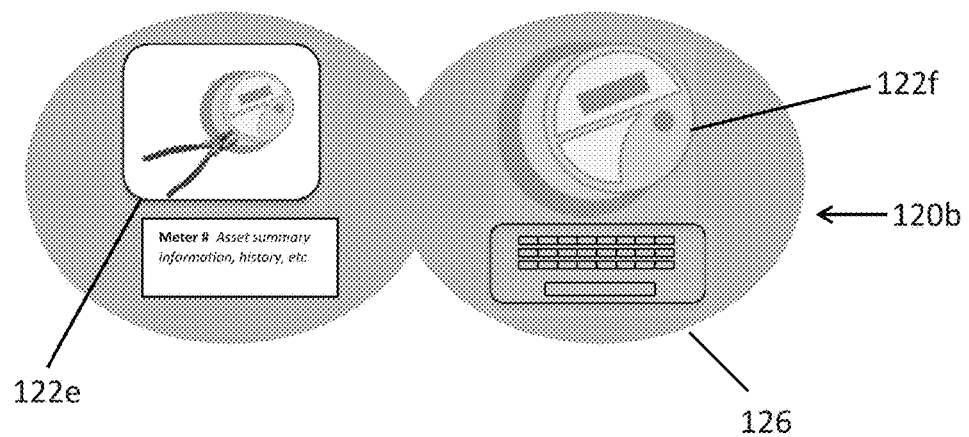
FIG. 5 is a diagram of a visual display presented on the head-mounted user device, according to some embodiments of the present invention, including asset installation, set-up and visual verification.

FIG. 5 shows various types of asset information 122 that can be displayed on the display 102 in accordance with the augmented or mixed reality display system described herein. In particular, the asset information 122 shown in FIG. 5 relates to asset installation and set-up, and visual verification of an installation.

To aid a technician in installing an asset, such as an electric meter 18, installation content 122*e* is displayed. The installation content 122*e* may include installation videos, images, interactive geometric element based representations, or other instructions or information relating to the installation of an asset, and may be overlaid on top of the user's field of view at the installation site to aid in the installation. The installation content or information 122*e* may be either static or streaming into the device and actionable via gesture controls or voice commands. Full asset information is summarized on the display 102 and updated based upon the user's activity. The installation content or information 122*e* can be received from a transformer mounted data collection device 20 or other device, or can be pre-stored in the memory 112.

Asset set-up and visual verification information 122*f* may also be displayed. A targeted asset is visual through the device's enhanced reality field of view. The camera 104 of the device can record installation and take an image of the completed installation at the installer's request. The installer can set up the asset through the use of a virtual keyboard 126, overlaid on the user's field of view through the display 104. Alternatively, the user can advance through the installation of the asset using other means for providing user input, such as the microphone 106 or hand-operated controller device.

FIG. 6

Figure 6:
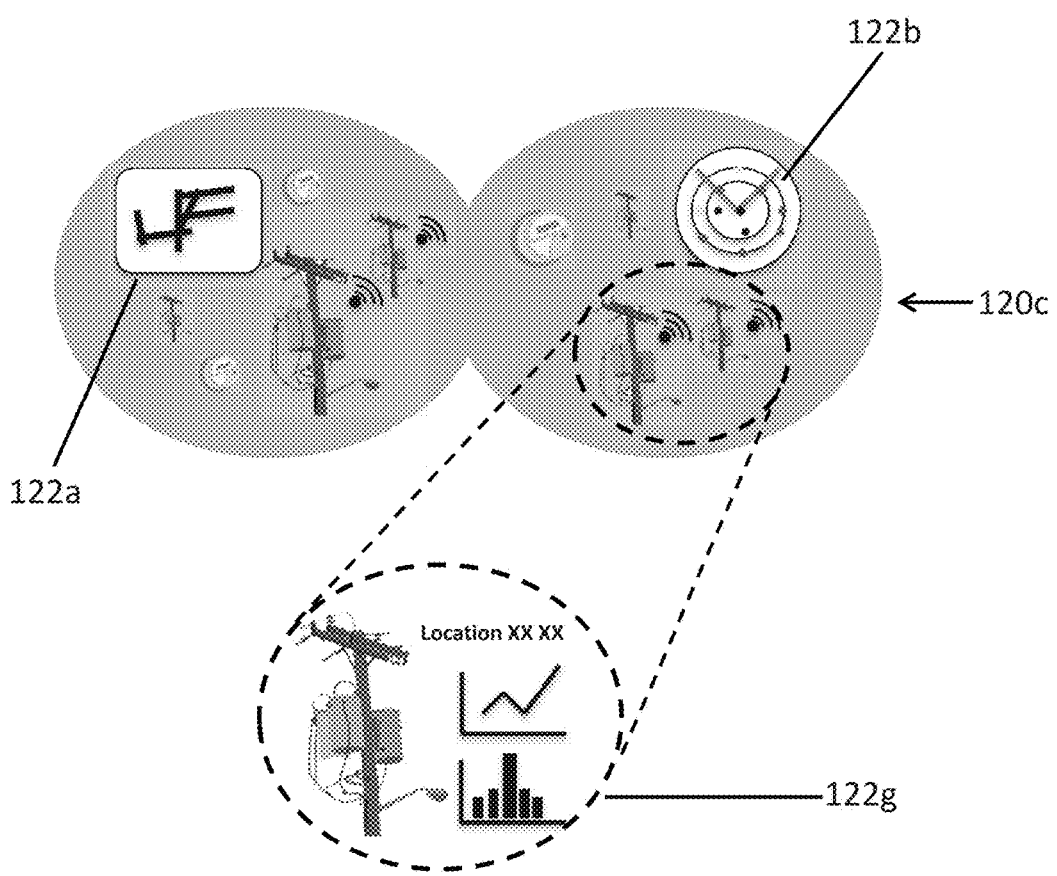
FIG. 6 is a diagram of a visual display presented on the head-mounted user device, according to some embodiments of the present invention, including energy diversion identification, prioritization and localization.

FIG. 6 shows various types of asset information 122 that can be displayed on the display 102 in accordance with the enhanced or augmented/mixed reality display system described herein. In particular, the asset information 122 shown in FIG. 6 relates to asset energy diversion identification, prioritization and localization.

Asset selection and statistics information 122*g* can be displayed, in which energy diversion assets are highlighted geo-spatially and organized via specific filtering requirements of the user. An asset can be selected for the display of asset selection and statistics information 122*g* as described previously herein in connection with the selection of an asset for display of other information relating to the asset. Current and historical data may be selected and displayed for these assets to identify the extent of energy diversion. Information helpful to the user is included regarding installation, set-up, access and local surroundings. Summary data regarding local and regional energy diversion statistics are summarized with this asset, providing the capability to prioritize instances of energy diversion within a region, indicate how much of the diversion in the region is resulting from a particular asset, and correct accordingly. A ranking of assets in a region can be displayed, in addition to, for example, the percentage of total diversion in the region the asset is responsible for and the location of the asset. The status of a location may also be indicated, which would identify the accessibility of the location of the asset and any particular notes pertinent to the location of the diversion. For example, if the particular location is within an area that is inaccessible by roads, the user may modify their route and transportation for reaching the location.

Asset routing 122*a* information and asset radar information 122*b* may also be provided in connection with energy diversification information. The asset radar information 122*b* can be configured in a manner to allow the user to focus on potential issues or specific cases of energy diversion.

FIG. 7

Figure 7:
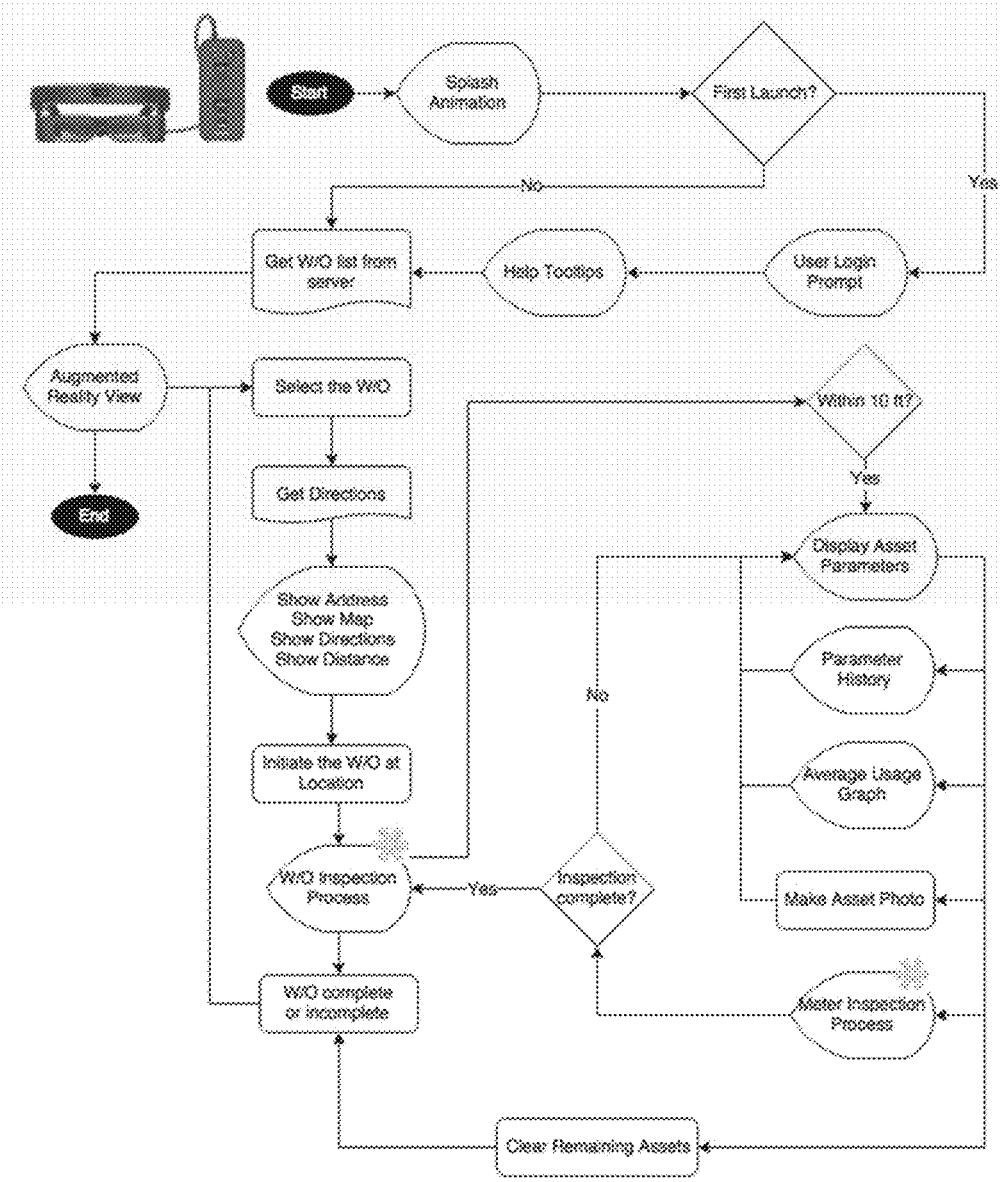
FIG. 7 is a diagram of a method for accessing a list of work orders and selecting and advancing through a work order using the head-mounted user device of the present invention.

In accordance with a further aspect of the present invention, the head-mounted user device 100 may be used to guide a user through one or more work orders in the field. An example of the presentation and selection of a work order using the head-mounted user device 100 is shown in FIG. 7.

After the user initiates the head-mounted user device 100, the head-mounted user device 100 is configured to receive a work order (W/O) list from a server, typically provided from a cloud computing environment, and store the list in the memory 112 of the head-mounted user device. The work order list is displayed on the display 102 of the device 100. The user selects a particular work order relating to an asset using one of the input methods described herein, and directions to the asset are determined by the device 100 and displayed, as described previously herein. When the user arrives at the location of the asset, the processor 110 of the device 100 is configured to initiate an interactive guide for the work order, which includes a series of interactive directives that are displayed by the device by overlaying the directives on the display 102 for the user to view while conducting the work required by the work order. The work order directives can be preloaded into the memory 112 of the device 100, together with any notes from a supervisor regarding the work order or asset, or they may be sent to the device 100 from a remote location as the user is proceeding through the work order, such as downloaded from a cloud based server or sent from another user device at a separate location interacting with the device 100 as the user proceeds through the work order. When the user is at the asset location, the device 100 is configured to display to the user information regarding the asset, such as the asset parameters, parameter history and average usage. The device 100 may be configured to automatically display such information about the asset when it is determined that the device 100 is within a certain distance from the asset, such as five to ten feet, in accordance with asset location determination methods described herein. After the user proceeds through the work order directives, the work order can be considered complete or incomplete, and the user can proceed to selecting a further work order.

FIG. 8

Figure 8:
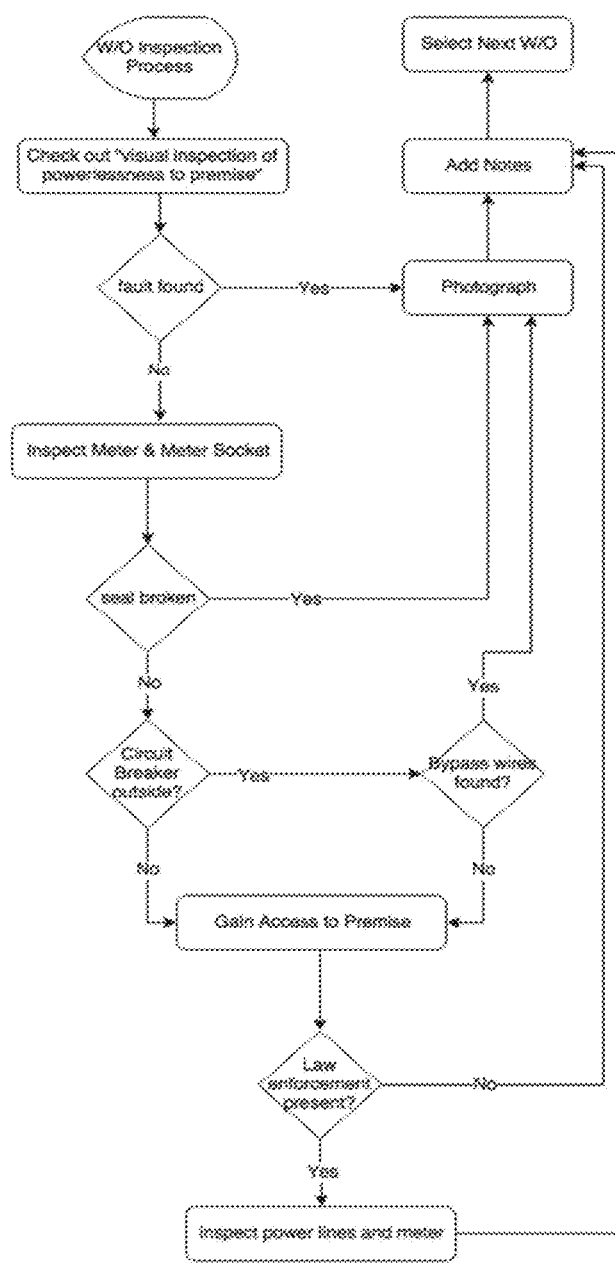
FIG. 8 is a diagram of an example of an interactive work order for assessing an instance of energy diversion using the head-mounted user device according to the present invention.

One example of a work order interactive guide is shown in FIG. 8 and described below, relating to a user responding to an instance of potential energy diversion. The head-mounted user device 100 displays a series of prompts to the user to guide the user through the investigation and possible repair.

First, the user is instructed to perform visual inspection of power lines to premise to see if there are visible signs of tampering. The user is instructed to determine if there are wires running from the transformer to a home, bypassing a meter. If so, the user is directed to photograph the lines using the camera 104 and complete the order. If not, the user is directed to continue with the prompts, which directs the user to inspect the meter and meter socket. If the meter seal is broken, the user is directed to photograph the lines using the camera 104 and complete the order. If the meter seal has not been tampered with, the user is directed to determine if a circuit breaker box is located outside the home, and if it is, to inspect the box to determine if there are any bypass wires entering from a meter socket. If bypass wires are entering the circuit breaker box from the meter socket, the user is directed to photograph the lines using the camera 104 and complete the order. If the meter seal has not been broken or if there are not bypass wires entering from the meter socket, the user is directed to contact law enforcement or security personal to attempt to gain access to the premise. If access is granted, the user is directed to inspect at the home, the power lines and meter for tampering or bypass. If a bypass or tampering is found, the user is directed to document it and complete the work order. If no bypass or tampering is found, the user is directed to complete the work order. On completion of the work order, the user is directed to enter any additional notes or comments resulting from the work order.

A further example of an interactive work order guide generated by the head-mounted user device is explained below for a meter inspection process.

After the user arrives to the location of the meter to be inspected, if the meter is inside the premises and the user is not able to gain access to the meter, the user is directed to mark the work order as incomplete. If the user is able to gain access to the meter, the user is directed to proceed with inspection of the meter. The user is first directed to inspect the meter to determine if the meter is functioning. If the meter is not functioning, the user is directed to determine if the meter can be replaced at that time. If the user is able to replace the meter, a new interactive guide is presented to the user for the meter replacement procedure. If the meter cannot be replaced, the work order is determined to be incomplete and additional work is required. If the meter is functioning, the user is directed to inspect the meter box to ensure that the lines are properly connected.

If the meter lines are not properly connected, the user is directed to photograph the improperly connected meter and wiring with the camera 104 and then fix the installation. After the installation has been fixed, the user is directed to photograph the repaired meter and wiring with the camera 104, and mark the work order complete. If the lines are connected properly at the meter box, the user is directed to complete the work order and note that no issue found with the meter.

THE SCOPE OF THE INVENTION

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

What we claim is:
1. A head-mounted user device comprising:
 a signal processor configured to:
  receive signaling containing information about one or more assets in a distributed power grid network from a data collection device configured to receive data from the assets in the distributed power grid network; and
  determine, based at least partly on the signaling received from the data collection device, signaling containing asset display information about the one or more assets;
 an augmented or mixed reality display configured to display an actual field of view of the user and the asset display information by overlaying the asset display information over the actual field of view; and
 means for mounting the device to the head of the user such that the display is in the user's field of view;
 wherein the data collection device is a transformer mounted data collection device configured to receive signaling containing information about collected data, including some combination of electrical signaling data related to electrical signaling being processed by the transformer located and arranged in the distributed smart grid network and to which the data collection device is mounted, metered data related to associated electrical signaling being provided from the transformer to a building or structure in the distributed smart grid network, and other wireless network data related to other wireless network communication devices/nodes/end points deployed in the distributed smart grid network.

2. The head-mounted user device according to claim 1, further comprising means for providing user inputs to the head-mounted user device.

3. The head-mounted user device according to claim 1, wherein the asset display information includes a real-time review of asset performance.

4. The head-mounted user device according to claim 1, wherein the received signaling containing information about one or more assets includes information about the geographic position of the one or more assets; and
 wherein the signal processor of the head-mounted user device is further configured to determine the location of the one or more assets relative to the head-mounted user device based on the received information, and is configured to update the location of the one or more assets relative to the head-mounted user device as the user wearing the head-mounted user device moves.

5. The head-mounted user device according to claim 4, wherein the asset display information includes identification and flagging of health indicators of the one or more assets together with the location of the one or more assets.

6. The head-mounted user device according to claim 4, wherein the asset display information includes routing information directing the user to the asset overlaid on the display.

7. The head-mounted user device according to claim 1, further comprising at least one forward facing camera mounted in front for receiving images and one or more additional cameras mounted around the device periphery.

8. The head-mounted user device according to claim 7, wherein the at least one forward facing camera is configured to capture real-time images of the user's environment in the user's field of view, and the display is configured to display the real-time images of the user's environment in the user's field of view, onto which the information about said assets is overlaid.

9. The head-mounted user device according to claim 1, wherein the means for mounting comprises an adjustable head strap.

10. The head-mounted user device according to claim 1, further comprising a microphone configured to receive voice commands from the user.

11. The head-mounted user device according to claim 1, wherein the asset display information includes information about an asset routing identification comprising a map directing the user of the head-mounted device to the asset on a recommended route determined by the processor.

12. The head-mounted user device according to claim 1, wherein the asset display information includes information about geo-spatial asset overlay that identifies assets by type overlaid on the field of view, including where relative size of the asset display information varies in proximity to the user.

13. The head-mounted user device according to claim 1, wherein the asset display information includes information about geo-spatial asset selected that provides a complete overview on performance data throughput, health and location.

14. The head-mounted user device according to claim 1, wherein the asset display information includes information about asset installation, set-up and visual verification, including where a targeted asset is visualized through the augmented or mixed reality display.

15. The head-mounted user device according to claim 1, wherein the augmented or mixed reality display comprises a transparent display screen configured to allow the user to see the actual field of view through the transparent display screen and to display the asset display information.

16. The head-mounted user device according to claim 1, further comprising a hand-held controller device configured to permit user interaction with the head-mounted user device.

17. A head-mounted user device comprising:
a signal processor configured to:
receive signaling containing information about one or more assets in a distributed power grid network from a data collection device configured to receive data from the assets in the distributed power grid network; and
determine, based at least partly on the signaling received from the data collection device, signaling containing asset display information about the one or more assets;
an augmented or mixed reality display configured to display an actual field of view of the user and the asset display information by overlaying the asset display information over the actual field of view; and
means for mounting the device to the head of the user such that the display is in the user's field of view,
wherein the asset display information includes overlaid instructions for asset installation on the transformer and residential/commercial metering locations, including interactive and virtual cues to be overlaid over the field of view so as to provide a virtual keyboard for asset set-up.

18. A head-mounted user device comprising:
a signal processor configured to:
receive signaling containing information about one or more assets in a distributed power grid network from a data collection device configured to receive data from the assets in the distributed power grid network; and
determine, based at least partly on the signaling received from the data collection device, signaling containing asset display information about the one or more assets;
an augmented or mixed reality display configured to display an actual field of view of the user and the asset display information by overlaying the asset display information over the actual field of view; and
means for mounting the device to the head of the user such that the display is in the user's field of view,
wherein the asset display information includes an asset radar that provides a summary of locations of a plurality of assets, within specified distance increments from the head-mounted user device, which is displayed in the center of the asset radar.

* * * * *